United States Patent [19]

Lammers et al.

[11] Patent Number: 4,830,479

[45] Date of Patent: May 16, 1989

[54] ROTATING DOPPLER FREQUENCY SHIFTER

[75] Inventors: Uve H. W. Lammers, Chelmsford; Richard A. Marr, Billerica, both of Mass.

[73] Assignee: The United States of America as represented by the Secretary of the Air Force, Washington, D.C.

[21] Appl. No.: 197,935

[22] Filed: May 24, 1988

[51] Int. Cl.$^4$ .......... G02B 27/00; G02B 7/18; G02B 5/10; G02B 5/08

[52] U.S. Cl. .......... 350/486; 350/622; 350/624; 350/618; 350/6.5

[58] Field of Search .......... 350/486, 622, 624, 618, 350/6.5

[56] References Cited

U.S. PATENT DOCUMENTS 4,264,141  4/1981  Guers et al. .......... 350/486
4,418,989  12/1983  McCulla et al. .......... 350/486

OTHER PUBLICATIONS

Veron, D., "High Sensitivity HCN Laser Interferometer for Plasma Electron Density Measurements", Optics Communications, vol. 10, No. 1, Jan. 1974, pp. 95–98.

Manuccia, T. J., "CW IR Laser Induced Chemistry, Isotope Separation and Related Laser Technology at NRL", Laser in Chemistry, Elsevier Sci. Pub. Co., 1977, pp. 210–215.

Manuccia, T. j., Laser Focus, vol. 13, No. 8, Aug. 1977, pp. 28–29.

Primary Examiner—Jon W. Henry
Attorney, Agent, or Firm—Donald J. Singer; Richard J. Donahue

[57] ABSTRACT

A rotating Doppler Frequency shifter comprises spiral members which surround a first mirror affixed to a rotating shaft, and a second mirror affixed to an arm which extends from the shaft and rotates therewith. Each spiral member has a reflective inner surface which is shaped such as to reflect a signal impinging thereon back along its entry path. This arrangement provides for a continuous Doppler frequency shifting of the input signal.

6 Claims, 2 Drawing Sheets

ROTATING DOPPLER FREQUENCY SHIFTER

STATEMENT OF GOVERNMENT INTEREST

The invention described herein may be manufactured and used by or for the Government for governmental purposes without the payment of any royalty thereon.

BACKGROUND OF THE INVENTION

At radio frequencies, superheterodyne receivers typically have sensitivities that are orders of magnitude higher than those of direct detection receivers. Such superheterodyne receivers, in addition to a signal source, usually require a separate local oscillator or pump source.

With certain constraints, superheterodyne receivers can be realized with just one source. The output from this source is divided and one of the component signals is Doppler shifted. The Doppler shifted component serves as the local oscillator source and the unshifted component serves as the signal source or vice versa. At submillimeter wavelengths, however, presently known electronic means of frequency shifting are very inefficient and produce very small output power levels.

Reflection of a signal from a metallic surface which is in linear motion will produce a constant Doppler shift of the reflected signal. As a practical matter, however, linear motion can only be sustained for limited periods of time. For a continuously Doppler shifted signal, some kind of repetitive process of linear motion must be employed.

Imperfections in presently known mechanical means for frequency shifting make it impossible to generate a single Doppler shifted frequency. Instead, a spectrum of frequencies is generated which has a frequency spacing which is the reciprocal of the period of the time repetitive process. This spectrum has a maximum amplitude at or near the frequency determined by the ratio of the velocity component of the reflector (or reflectors) in the direction of wave propagation and the wavelength. The spectral line of maximum amplitude is surrounded by other spectral lines whose amplitudes depend on the "smoothness" of the repetitive process.

A spectrum of frequencies, rather than a single frequency, is undesirable in certain applications, such as in radar applications, where they may lead to ambiguities. One way to eliminate this problem is to space the nondesirable lines far apart from the desired one. This requires a mechanical process of the highest possible repetition rate.

In an article entitled "High Sensitivity HCN Laser Interferometer For Plasma Electron Density Measurements" by D. Veron, which article appears in Volume 10, Number 1 of Optics Communications, dated January 1974, there is described a rotating mechanical frequency shifter which is, in effect, a large rotating paddle wheel. Each paddle reflects the signal over a small angle of rotation, where its motion can be considered as being linear. Then it is replaced by the next paddle. Although high Doppler offsets may be achieved with high tangential speed of the paddle, many paddles are required to satisfy the linear motion approximation. Consequently, the wheel will have a large diameter and a slow rate of rotation thus producing a close frequency spacing in the resulting spectrum.

In an article entitled "CW IR Laser Induced Chemistry, Isotope Separation and Related Laser Technology at NRL" by T. J. Mannucia, which article appears in Laser in Chemistry, pages 210-215, Elsevier Scientific Publication Company, dated 1977, there is described another mechanical Doppler frequency shifting scheme based upon multiple reflections between a stationary involute spiral cylinder and a multiplicity of mirrors attached to a concentrically rotating cylinder. The transmissive scheme as described by Mannucia, where radiation enters in an axial direction at one end of the cylinder and leaves at the other end of the cylinder, neglects the axial spreading between reflection points as reflections occur at increasing radial distances on the involute cylinder. In addition, it does not provide means to make the Doppler shifted signal phase coherent between cylinder revolutions and hence an undesirable spectral spreading will occur.

In U.S. Pat. No. 4,264,141 issued to Karl Guers et al on Apr. 28. 1981, there is disclosed an arrangement of apparatus for frequency shifting a monochromatic narrow bandwidth light beam. Unlike the Mannucia device and the present invention, the Doppler shifting curved surfaces are not involutes of circles. Like the Mannucia device, however, it is a transmissive type device, and not a device in which an input signal is reflected back upon itself, as is the case in the present invention. The Guers et al patent requires pairs of stationary and pairs of rotating reflectors in order to function. A continuous wave device employing several pairs of Doppler shifting mirrors would therefore be physically large in comparison to the present invention. Furthermore, no provisions have apparently been made for a phase-continuous transition from one frequency shifting contour to the next, which is essential in narrowing the output spectrum.

OBJECTS AND SUMMARY OF THE INVENTION

It is therefore an object of the present invention to provide a rotating Doppler frequency shifter device of improved construction and performance.

It is another object of the present invention to provide a rotating Doppler frequency shifter device especially adapted for use in the submillimeter wavelength range.

It is a further object of the present invention to provide a rotating Doppler frequency shifter device which is efficient in providing high output power levels in its frequency range of operation.

It is a further object of the present invention to provide a rotating Doppler frequency shifter device which is mechanically tunable to achieve an output signal of the narrowest spectral width for a given input frequency.

In accordance with the present invention, a rotating Doppler frequency shifter device comprises several identically shaped spiral members which surround a first mirror affixed to a rotating shaft and a second mirror affixed to an arm which extends radially from the shaft and rotates therewith. Each spiral member, which may be mechanically tuned, has a reflective inner surface which varies in distance from the mirrors and is shaped such as to reflect a signal impinging thereon back upon itself. This arrangement provides for continuous Doppler frequency shifting of the input signal and an output signal of the narrowest spectral width for a given input frequency.

BRIEF DESCRIPTION OF THE DRAWINGS

The foregoing and other objects, features and advantages of the present invention will become more apparent upon reading the following detailed description thereof in conjunction with the drawings.

DETAILED DESCRIPTION OF THE INVENTION

Figure 1:
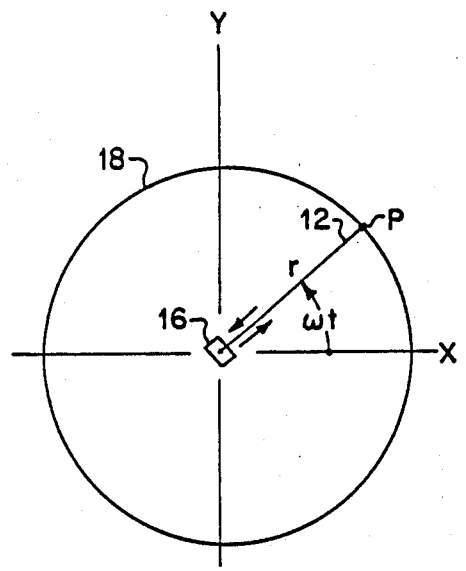
FIG. 1 is a geometric representation of a ray being directed by a rotating mirror onto the reflective interior wall of a cylinder.

Referring now to FIG. 1 of the drawings, there is depicted a ray 12 entering the paper plane perpendicularly along an axis Z orthogonal to axes X and Y. Ray 12 is deflected into the paper plane by a mirror 16 which is located at the origin and is oriented upwardly at a forty five degree angle from the paper plane. Mirror 16 rotates with an angular velocity $\Omega$ around axis Z which is in line with the arriving ray 12. At the point P, ray 12 is retroreflected back on itself by the wall of a circular cylinder 18 of radius r and concentric with the axis Z. After that, ray 12 is retroreflected by mirror 16 along the path of its arrival. This assumes that mirror 16 has turned insignificantly, while the ray 12 traverses the distance 2r. Although ray reversal has been achieved, no Doppler shift is realized because of the constant path length along the radius r.

Figure 2:
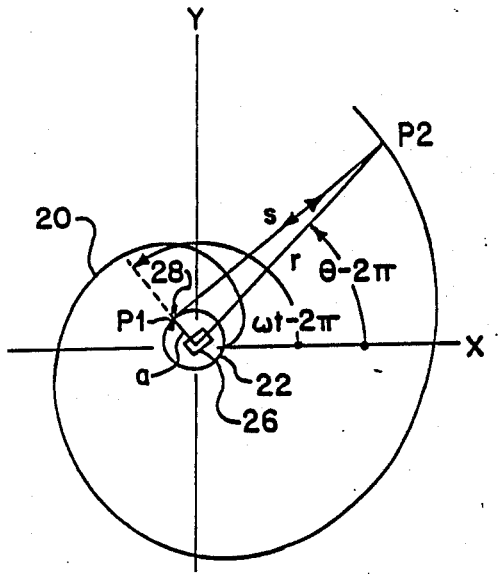
FIG. 2 is a geometric representation of a rotating Doppler frequency shifter utilizing a single involute spiral reflective surface.

In FIG. 2, however a reflecting surface is formed on the inner wall of a spiral member 20 whose spiral shape is the involute of a circle. Such a spiral may be formed, for example, by tracing the end of a taut string which is unwound from the circumference of a circle of radius a. Spiral member 20 has the polar equation $$\theta = \sqrt{(r/a)^2 - 1} - \tan^{-1} \sqrt{(r/a)^2 - 1} \quad \text{(Eq 1)}$$

and has two important characteristics. Length s, which is the tangent to the circle 22 at point P1 and extends to point P2, is proportional to the rotational angle $\Omega t$. It is also orthogonal to the spiral member 20 at point P2, independent of its angle $\Omega t$. A ray striking the center of mirror 26 which, like mirror 16 of FIG. 1 is positioned at the central axis Z and at a forty five degree angle from the paper plane, is reflected to point P1 on mirror 28 and thence to point P2 on spiral member 20. Mirror 28 is perpendicular to the paper plane and made to rotate together with mirror 26 at a distance "a" from the central axis Z. A ray striking the spiral member 20 is reflected on itself and leaves on the same path as it had entered.

If a spiral member covering 360 degrees of revolution is provided, as shown in FIG. 2, and if the change of length s per complete revolution is an integer multiple of half the wavelength $\lambda/2$, assuming this is a reflective device, then the Doppler shift experienced by the signal is:

$$\Delta f = d/dt \, (2s/\lambda) = 2\Omega a/\lambda \quad \text{(Eq. 2)}$$

If the change of length s is not an integer multiple of half of a wavelength, the Doppler shifted signal will be phase modulated and spectrally broadened. It will be noted that r does not change linearly with $\Omega t$, but s does. Also that s is the instantaneous radius of curvature of spiral 20.

Figure 3:
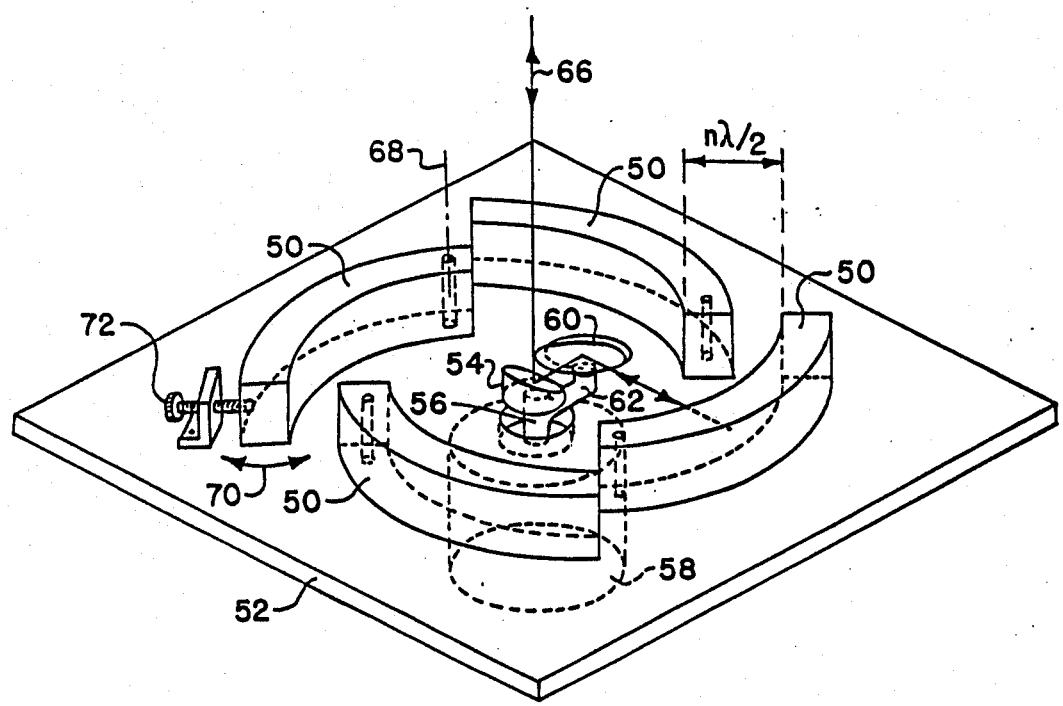
FIG. 3 is a pictorial representation of a preferred embodiment of the rotating Doppler frequency shifter of the present invention.
Figure 4:
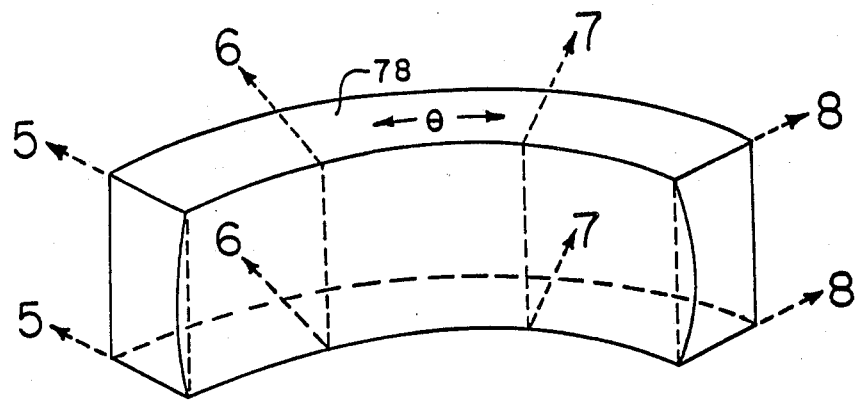
FIG. 4 is a pictorial representation of an alternate embodiment of a spiral member of the present invention.
Figure 5:
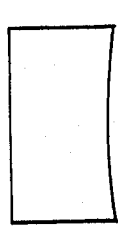
FIGS. 5-8 are end views and sectional views taken through the spiral member depicted in FIG. 4.
Figure 6:
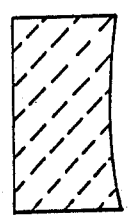
Figure 7:
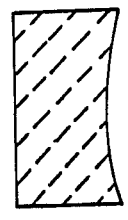
Figure 8:
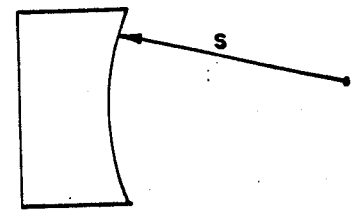

FIG. 3 is a perspective view of a preferred embodiment of the present invention. Instead of using one spiral member with one step of $\Delta s$, per 360 degree rotation, a preferred embodiment of the present invention uses four spiral members 50 mounted on a plate 52 with steps of $\Delta s/4$ per 90 degrees of rotation. It is possible to use four members with steps of $\Delta s/4$ per 90 degrees of rotation or any odd or even number of members, as long as each step is an integer multiple of $\lambda/2$. Each member has exactly the same spiral shape, and is not merely the succeeding portion of the same involute.

Such arrangements are much easier to manufacture than the piror art devices and provide smaller radial pathlength changes for the signal, which is important because of the rapid defocusing of submillimeter waves.

As seen in FIG. 3, a first mirror 54 is attached to the shaft 56 of a motor 58 mounted below plate 52. Motor 58 spins mirror 54 at an angular speed $\Omega$ about the central axis of the spiral members 50. A second mirror 60 is attached to the shaft 56 by a side arm 62 which extends radially therefrom. Mirrors 54 and 60 are oriented in the same manner as the mirrors 26 and 28 of FIG. 2. The reflective surfaces of spiral members 50 have a radial separation of $n\lambda/2$ at their ends.

In operation, an input signal ray 66 impinges on mirror 54 which together with mirror 60 is rotating at a speed $\Omega$. Ray 66 is reflected by mirror 54 to mirror 60 and thence to the reflective surface of a spiral member 50. Because of the particular curvature of the reflective surface of member 50, ray 66 is reflected back upon itself to retrace its path back to its source. As mirrors 54 and 56 rotate, the distance the ray 66 must travel increases linearly until it reaches the end of a member 50, where it abruptly decreases. This action is repeated as ray 66 traverses the next spiral member 50. This repetitive action produces the desired linear sweep and the resultant constant Doppler shift of the input ray 66.

The requirement for the radial transitions between segments 50 to be integer multiples of $\lambda/2$ necessitates narrow mounting tolerances for the members at submillimeter wavelengths. Also, a device with rigidly mounted members 50 will only work optimally at a single input frequency. In order to alleviate construction tolerances and to make the frequency shifter useful over a range of input frequencies, members 50 are each mounted in such a way on plate 52 that they can be rotated around an axis 68 at one end thereof and perpendicular to plate 52. At the other end of each member 50, a radial adjustment as shown by arrows 70 is achieved with a mechanical screw-type adjuster 72. For clarity of the drawing, only one of the spiral members 50 is shown having such a mechanical screw-type adjuster 22. If $n\lambda/2$ is much larger than $\lambda/4$, the maximum required adjustment range, then adjustments will not upset the reflection geometries noticeably.

It will be appreciated that the reflecting inner surface of each spiral member 50, being linear rather than curved in the vertical plane, may disturb the symmetry of an input beam of finite diameter. In most applications, this may be acceptable, especially since this effect is minimized at larger radii of curvature and with smaller beam diameters. A further improvement in beam symmetry can be achieved however, by making the vertical surface conform instead to the radius of curvature in the horizontal plane at each angular location.

As seen in FIGS. 4-8 of the drawings, a spiral member 78 may be curved along its height as well as along its length. The radius of curvature in the height dimension varies as the radius of curvature along its length. As seen in the end and sectional views of FIGS. 5-8, at each angular position $\theta$ the curvature is circular with a radius of curvature s. The radius of curvature s, however, will be seen to increase as $\theta$ increases. The result of this dual curvature of a spiral member 78 is that the distortion of a beam of finite diameter is minimized.

Figure 9:
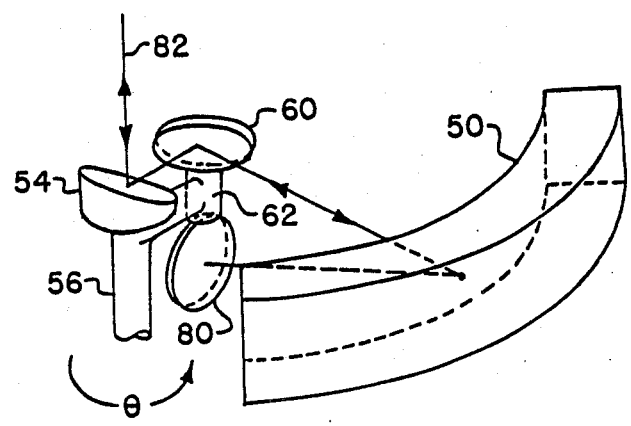
FIG. 9 is a pictorial representation of a further embodiment of the present invention.

Higher Doppler frequencies can be achieved by adding one or more additional mirrors on the arm 62 of shaft 56. As shown in FIG. 9 of the drawings, an additional mirror 80 has been affixed to arm 62 and mirror 60 has been tilted slightly to direct the ray 82 downwardly to spiral member 50, where it is now directed towards mirror 80. The ray impinges on mirror 80 perpendicularly and is reflected back on itself.

It will be appreciated that the vertical height or wall of spiral member 50 may have to be increased to account for the fact that the ray travels down the spiral member as the motor shaft turns. Also, the vertical extent of the additional mirror 80 must be sufficient to intercept the ray as it travels down the surface thereof.

Also, should this embodiment of the invention be implemented with spiral members that are curved in their height as well as their length dimension, then the curvature in the height dimension will differ from the curvature used in spiral members 78 in order to account for the traveling of the beam down the reflective wall of the spiral member.

The rotating Doppler frequency shifter described herein is of particular usefulness at submillimeter wavelengths. It should be noted however, that there are no conceptual restraints in applying the same techniques from millimeter to infrared or even to visible wavelengths.

Although the invention has been described with reference to particular embodiments thereof, it will be understood to those skilled in the art that the invention is capable of a variety of alternative embodiments that come within the spirit and scope of the appended claims.

What is claimed is:

1. Apparatus comprising:
   a rotatable shaft;
   and first, second and third ray reflector means;
   said first ray reflector means being affixed at the rotational axis of said shaft and oriented to reflect rays traveling toward and substantially coaxial with said shaft towards said second ray reflector means;
   said second ray reflector means being affixed to said shaft to rotate at a fixed radius about the axis of said shaft and being oriented to reflect rays impinging thereon from said first ray reflector means toward said third ray reflector means;
   said third ray reflector means comprising a plurality of ray reflective members each having an identically-shaped spiral surface whose distance from said second reflector means varies in a manner to reverse the path of rays impinging thereon from said second ray reflector means back along the same path to said second reflector means at all rotational angles of said shaft.

2. Apparatus as defined in claim 1 wherein said spiral surface of each of said plurality of ray reflective members varies in distance from said second ray reflector means in accordance with the involute of a circle whose radius is the same as the radius of said second ray reflector means from said axis of said shaft.

3. Apparatus as defined in claim 2 wherein said involute of a circle is selected such that the transition between adjacent ones of said plurality of ray reflective members is an exact multiple of half of the wavelength of a ray entering said apparatus.

4. Apparatus as defined in claim 3 wherein each of said plurality of ray reflective members is adjustable by rotation to achieve tuning to a selected one of a range of ray wavelengths.

5. Apparatus as defined in claim 4 wherein said reflective surface of each said plurality of ray reflective members is curved along its height in accordance with the radius of curvature along its length.

6. Apparatus as defined in claim 4 and further comprising at least one additional mirror affixed to said arm of said shaft and oriented together with said second mirror to reflect a ray therebetween via said plurality of reflective members.

* * * * *